United States Patent [19]

Stipe

[11] Patent Number: 5,064,400

[45] Date of Patent: *Nov. 12, 1991

[54] APPARATUS FOR GRADING SHRIMP

[76] Inventor: James J. Stipe, 114 Bowie St., Baytown, Tex. 77520

[*] Notice: The portion of the term of this patent subsequent to Jun. 19, 2007 has been disclaimed.

[21] Appl. No.: 512,377

[22] Filed: Apr. 23, 1990

[51] Int. Cl.⁵ .............................................. A22C 29/00
[52] U.S. Cl. ........................................... 452/2; 452/1; 452/184; 452/177
[58] Field of Search ......................... 17/24, 71, 72, 73; 452/1, 2, 3, 4, 5, 19, 177, 178, 182, 183, 184

[56] References Cited

U.S. PATENT DOCUMENTS

| | | | |
|---|---|---|---|
| 2,663,897 | 12/1953 | Greiner et al. | 17/71 |
| 2,888,709 | 6/1959 | Lapeyre | 17/71 |
| 2,958,896 | 11/1960 | Merrick | 17/71 |
| 3,691,592 | 9/1972 | Ward | 17/71 |
| 3,696,466 | 10/1972 | Letchworth | 17/71 |
| 3,750,233 | 8/1973 | Lovett | 17/71 |
| 4,016,625 | 4/1977 | Mitchell | 17/71 |
| 4,692,965 | 9/1987 | Stephenson | 452/181 |
| 4,916,776 | 4/1990 | Allain | 17/71 |
| 4,934,028 | 6/1990 | Stipe | 17/71 |
| 4,941,233 | 7/1990 | Allain | 17/71 |

Primary Examiner—James G. Smith
Assistant Examiner—Lawrence Cruz
Attorney, Agent, or Firm—James L. Jackson

[57] ABSTRACT

A shrimp grading mechanism is provided which incorporates a shrimp conveyer and orienter for conveying shrimp oriented in head-up, body-down position along a linear path. The conveyor incorporates a plurality of pan segments which collectively form a movable trough having a slot at the bottom portion thereof. Shrimp smaller than a preselected size range will fall through the slot while shrimp of the preselected size range will be gripped at the juncture of the heads and body and supported by the opposed pan segments of the conveyor. The conveyor pans engage the shrimp in a pivot-like manner thereby permitting the heavier body portions of the shrimp to pivot downwardly such that each of the shrimp is positioned in head-up, body-down relation while being conveyed to the end of the conveyor. Several shrimp grading machines may be placed in cascading relation with succeeding machines being adjusted for smaller size ranges of shrimp falling from the conveyor of the immediately preceding shrimp grading machine.

17 Claims, 3 Drawing Sheets

APPARATUS FOR GRADING SHRIMP

FIELD OF THE INVENTION

This invention relates generally to apparatus for rapidly, efficiently and accurately grading random sizes of shrimp while on board shrimp trawlers or other vessels or at a suitable shrimp processing facility.

RELATED INVENTION

This invention is related to the subject matter of Applicant's prior U.S. pat. application Ser. No. 07/335,091, filed Apr. 7, 1989, entitled Method And Apparatus For Deheading And Grading Shrimp, now U.S. Pat. No. 4934028.

BACKGROUND OF THE INVENTION

Shrimp are typically gathered for marketing by means of shrimp trawls which are pulled through the water, typically along the bottom of a body of water by shrimp boats or by other suitable means. After the shrimp are caught they are typically stored in ice or in other conditions of cold storage until they can be transported to a shrimp processing facility. At the shrimp processing facility the shrimp may be packed in a heads-on condition or in a headless condition for transportation to a marketing facility or to the ultimate consumer. The sales price of shrimp is decreased materially by the various handling processes that are employed in grading and subsequently deheading the shrimp or deheading and then grading them for size and quality.

Prior to packing the fresh caught shrimp in ice in the cargo holds of shrimp trawlers, it is desirable to accomplish grading of the shrimp so that they may be sold and shipped without significant further handling. Such on board grading of shrimp is ordinarily not practical since most shrimp grading machines are of such large dimension that they cannot be efficiently mounted on a typical shrimp trawler. Moreover, shrimp grading machines are typically of sufficiently expensive nature that it is impractical to consider locating them on board shrimp trawlers. Although in many cases fresh caught shrimp are graded by manual operations on board shrimp trawlers for the purpose of protecting the catch by immediate cooling with ice to thus enhance the storage life thereof, manual shrimp grading operations can only be conducted if the volume of shrimp being caught is fairly low. In fact it has been determined that only approximately 10% of the shrimp being caught are manually graded and/or deheaded. Further, manual grading operations during shrimp catching and on board processing activities significantly enhances the cost of the shrimp that these activities are generally considered impractical. It is considered desirable therefore to place on board shrimp trawlers and other such vessels a shrimp grading machine of sufficiently small dimension and of sufficiently low cost as to be commercially acceptable for most shrimp trawlers.

SUMMARY OF THE INVENTION

Briefly, a shrimp grading machine constructed in accordance with the principles of the present invention comprises a framework structure supporting a pair of spaced endless conveyers such as chain conveyers which are operated at the same speed and which cooperate to form shrimp receiving receptacles and conveyers. Each of the endless conveyers are provided with a plurality of conveyer pans which travel in endless manner along with the respective conveyers which defines cooperating shrimp retainer portions capable of supporting shrimp of a particular size or larger. The shrimp retaining portions of the conveyer pans are also capable of achieving proper orientation of the shrimp as they are conveyed by the conveyer system to the terminal portion of the grading station and to transport the shrimp in a proper oriented manner for packaging if desired.

Shrimp of smaller size than the particular minimum size for which the shrimp conveyer system is adjusted will fall through the slot or space established by the conveyers where they may be transported by simple slides or other devices to the conveyers of other shrimp grading machines which are properly adjusted for smaller sized shrimp. In fact, several shrimp grading machines may be positioned in cascading relation such that the uppermost machine accomplishes grading of larger shrimp, one or more intermediate machines provide grading operations for medium sized shrimp and a lowermost machine will receive and grade smaller sized shrimp. The shrimp of random size will be deposited onto the conveyer system of the uppermost grading machine and, during grading operations, medium and small sized shrimp will fall through the openings of the conveyer system while the larger sized shrimp will be retained and positioned by the conveyer system for grading. The medium and small sized shrimp will fall onto a slide beneath the uppermost machine whereupon they are transferred laterally and deposited onto the conveyer of the next succeeding machine while the yet smaller sized shrimp will fall onto a slide for conducting them to the conveyer of a yet succeeding machine. For purposes of this invention the machines are described as being disposed in cascading relation. The resulting shrimp that are graded by each of the machines may be graded to a significant degree simultaneously with a shrimp deheading operation if desired. Consequently, further processing of the shrimp for marketing can be accomplished by other grading machines and procedures at significantly low cost. The shrimp will thus be discharged from the machine in a graded heads-on condition unless a deheading operation is also being conducted as the shrimp are graded.

The shrimp grading machine of this invention is adjustable to accommodate various sizes of shrimp. This adjustability may be accomplished through adjustment of conveyer guide and positioning bars or by adjustment of the spaced sprockets of the conveyer or by a combination of both types of adjustment. Any other means of adjustment may also be employed for adjusting the conveyers for grading.

It is desirable therefore to provide machines for grading shrimp on shrimp trawlers as well as in land-based facilities and to accomplish the grading process in a manner that ensures excellent quality of the shrimp being provided for marketing.

It is therefore a principle feature of the present invention to provide a novel conveying and grading machine for shrimp which is capable of receiving shrimp in random manner, properly orienting the shrimp and conveying them to a suitable receiver such as a particular section of the cargo hold of a shrimp trawler and by grading the shrimp simultaneously with the conveying operation. The shrimp may be loaded onto the conveyer by a manual loading operation or by means of loading conveyers or the like as desired.

It is also a feature of this invention to provide a novel shrimp grading machine that has the capability of being simply and efficiently modified for also accomplishing the deheading of the shrimp simultaneously with grading thereof.

It is an even further feature of this invention to provide a novel shrimp grading machine that is of sufficiently small dimension and of sufficiently low cost as to effectively facilitate utilization thereof on board most shrimp trawlers to thereby enable shrimp grading operations and if desired, shrimp deheading operations, to be conducted immediately after the shrimp are caught.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
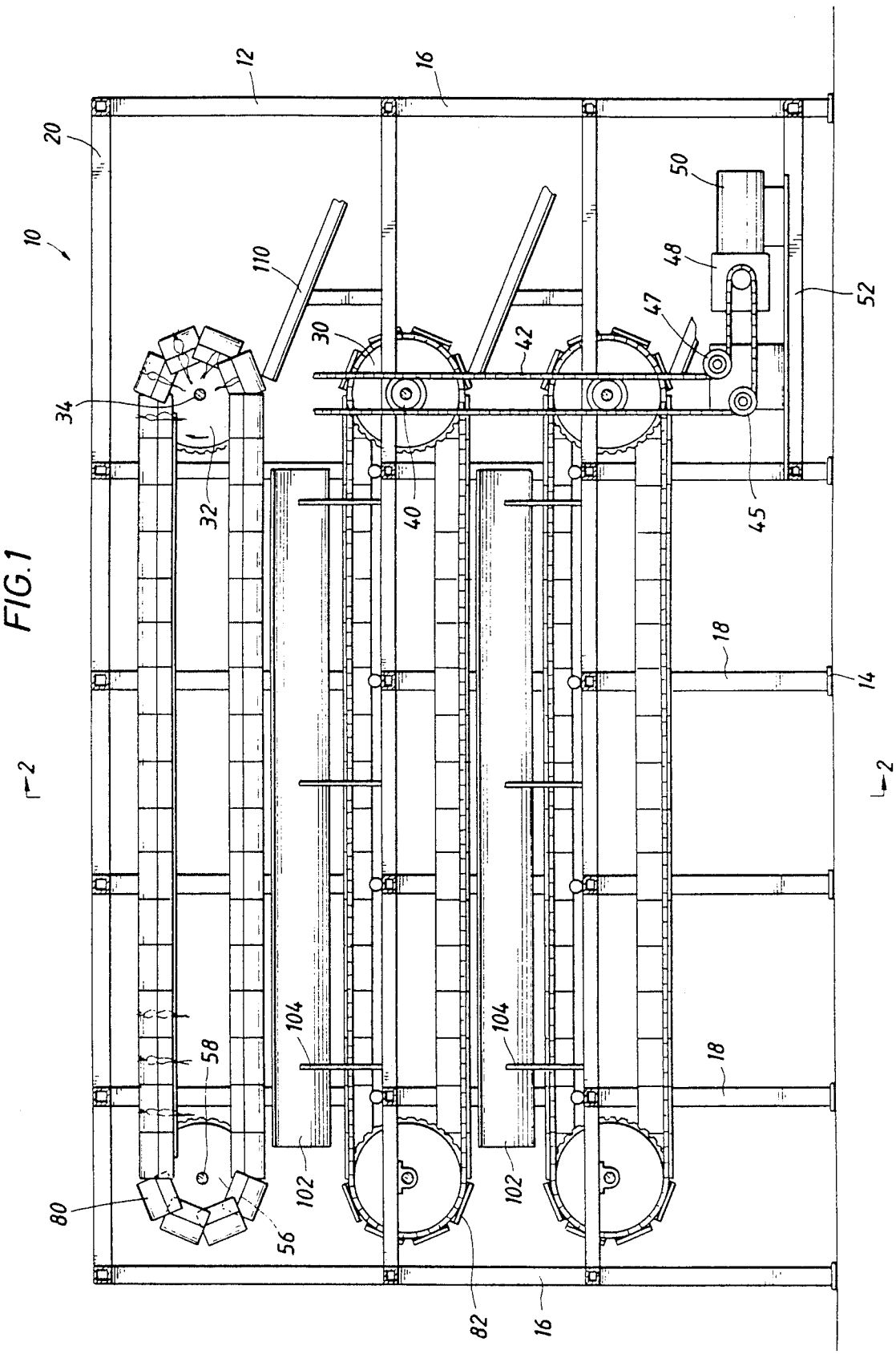

IN THE DRAWINGS:

FIG. 1 is a side view of a shrimp grading machine which is constructed in accordance with the teachings of the present invention and which represents the preferred embodiment of the invention.

Figure 2:
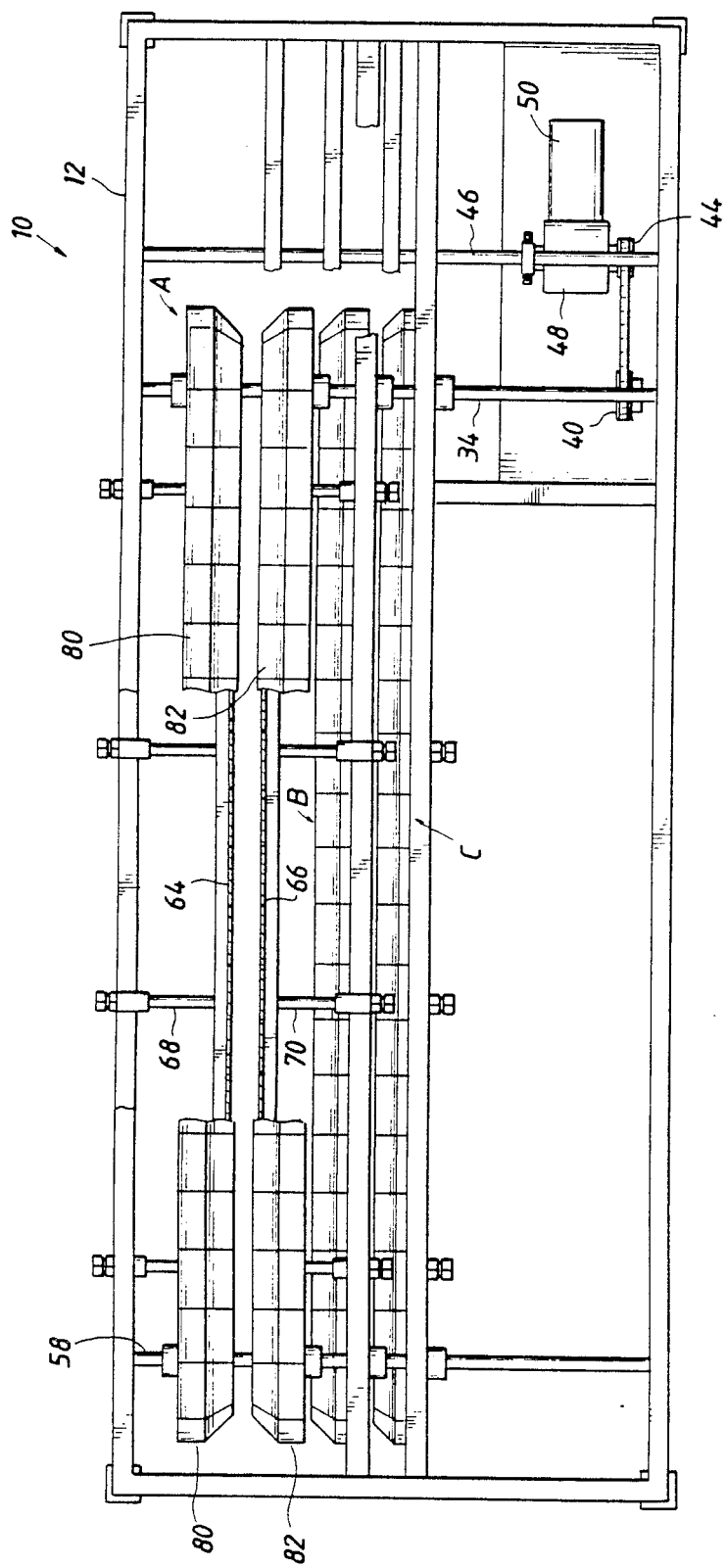

FIG. 2 is a plan view of the shrimp grading machine of FIG. 1.

Figure 3:
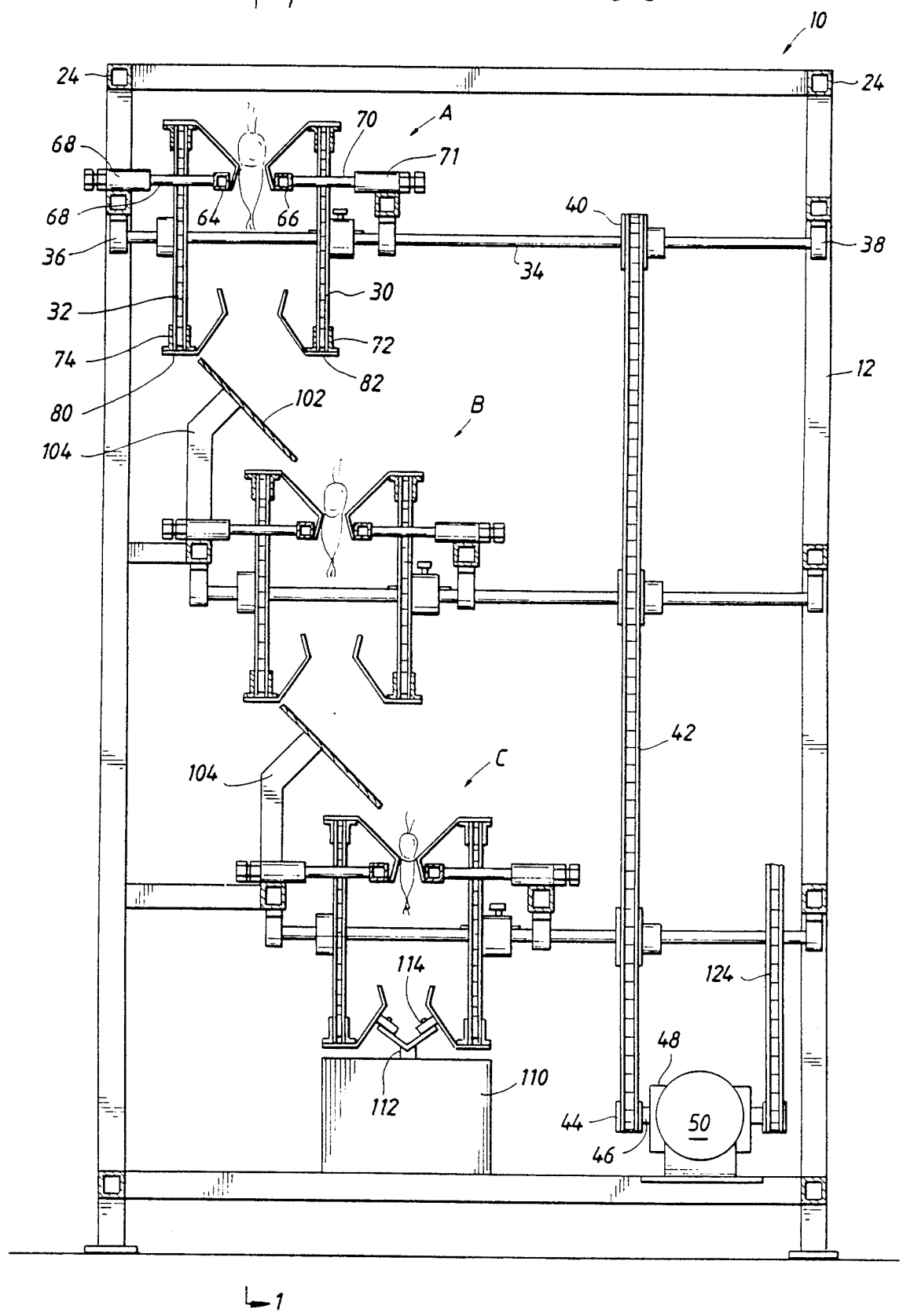

FIG. 3 is an end view of the shrimp grading machine of FIGS. 1 and 2.

Figure 4:
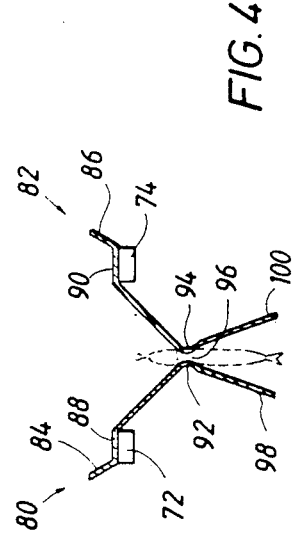

FIG. 4 is a fragmentary sectional view of the conveyer showing the preferred confirmation of the pan segments thereof and, in broken lines, showing a shrimp being supported thereby.

DETAILED DESCRIPTION OF PREFERRED EMBODIMENT

Referring now to the drawings and first to FIG. 1, a shrimp grading machine constructed in accordance with the present invention is illustrated generally at 10 and comprises a framework structure 12 having a base structure 14 enabling the machine to rest upon any suitable substantially flat surface or upon any suitable structure appropriately supporting the framework. The shrimp grading machine 10 may generally be described as a triple cascading shrimp grading machine assembly which is capable of grading three grades of shrimp which may be received in random manner by an uppermost conveyer of the machine. The triple cascading grading machine system shown in the drawings is of sufficiently small dimension that it may be efficiently mounted on the deck or other work station of a shrimp trawler for grading shrimp immediately upon removal thereof from the water. In the alternative, the grading machine may be appropriately mounted at the fixed base facility such as at a processing facility at a "shrimp farm" or shore based shrimp processing plant for accomplishing shrimp grading operations.

As shown in FIG. 1, the framework 12 incorporates vertical corner members 16 and intermediate vertical members 18 to provide for structural support of the framework as well as to provide for structural support of the operational components of the shrimp conveyers and shrimp grading apparatus. The framework structure 12 also incorporates upper and lower horizontal members 20 and 22 as well as a plurality of intermediate horizontal structural members which are shown at 24, 26, and 28. These horizontal members may be appropriately described as "groups" of horizontal structural members that cooperate with groups of vertical structural members to define a framework of efficient structural integrity without being excessively heavy or bulky. The vertical and horizontal structural members of the framework 12 are preferably composed of stainless steel of angle or tubular form which may be structurally interconnected by any suitable means such as welding, bolting, riveting, etc. The use of stainless steel is preferable from the standpoint of ensuring cleanliness of the shrimp processing operation.

The shrimp grading machine shown in the figures incorporates three conveying and grading sections each of which may be substantially identical. These shrimp conveyer and grading sections are identified as Sections A, B and C which are shown generally in FIG. 3 of the drawings. For purposes of discussion and simplification, and to facilitate a ready understanding of this invention, one of the conveyer grading sections will be described in detail while the other grading sections will be described in less detailed manner.

The conveyer grading section A incorporates an endless chain conveyer although such is not intended as limiting of the spirit and scope of this invention. It is intended that other suitable conveyer mechanisms for shrimp may be effectively utilized without departing from the spirit and scope of this invention. As shown in FIGS. 1-3 of the drawings, grading Section A includes a pair of conveyer sprockets 30 and 32 that are supported in nonrotatable relation by a transverse drive shaft 34. The drive shaft is in turn supported at its respective extremities by pillow block bearings 36 and 38 that are each fixed to the respective intermediate horizontal structural members 24. Thus, the sprockets 30 and 32 are maintained in spaced relation and are simultaneously rotated concurrently with rotation of the conveyer drive shaft 34. A drive shaft sprocket 40 is also disposed in nonrotatable relation with the drive shaft 34 and is adapted to receive a drive chain 42 in sprocket driving relation therewith. The drive chain 42 is in turn driven by a drive sprocket 44 which is fixed to the output drive shaft 46 of a reduction gear assembly disposed in sealed and lubricated assembly within a reduction gear box 48. The reduction gear assembly, which for example may be a 60-1 reduction gear system, is in turn driven by an electric motor 50 such as a ½ horsepower electric motor that is supported by a motor and a gear box support 52 of the framework structure 12. The motor 50 may also be used to drive other drive chains as shown at 53 in FIG. 3.

The spacing of the spaced sprockets 30 and 32 may be fixed if desired, or in the alternative, the sprockets 30 and 32 may be adjustable to vary the spacing of the sprockets and thus to controllably vary the spacing of the conveyer chains and the conveyer pans supported thereby. The spacing of the conveyer pans controls the size range of shrimp to be graded by the machine.

At the opposite end of the framework structure 12 a pair of driven sprockets 56 are supported in nonrotatable relation by means of a driven shaft 58. The shaft 58 is freely rotatable and journalled by means of pillow block bearings which are in turn supported by the intermediate horizontal members 24 of the framework assembly. The spacing of the sprockets 56 may be fixed if desired but, in the alternative, may be adjustable in the same manner as sprockets 30 and 32 are adjustable for controllably varying the spacing of the shrimp supporting and conveying pans of the conveyer and thus establishing shrimp grading for the particular variations of the size of the shrimp being processed by the shrimp grading machine. Adjustments of the shrimp conveyer and supporting pans may also be accomplished by means of a pair of spaced conveyer guide and adjustment 64 and 66 which are supported by adjustment bars 68 and 70. Typically the adjustment bars 68 and 70 each have an externally threaded section defined thereon which is received in driving relation with internally threaded elements 69 and 71 which are fixed to the framework assembly. Therefore, upon rotation of the adjustment bars, the guide and adjustment members 64 and 66, which may also be referred to as spreader bars, are moved toward or away from one another for purposes of adjusting the relative spacing of the conveyer pans.

A pair of endless chains 72 and 74 are disposed about the respective pairs of horizontally spaced sprockets. Since the sprockets are driven at the same rotational velocity by virtue of their being nonrotatably locked to the drive shaft 34, the conveyer chains 72 and 74 will likewise be driven at the same velocity.

As shown in the sectional view of in FIG. 3, a plurality of conveyer pan segments or trays are fixed to the various links of the conveyer chains 72 and 74. These pan segments are shown generally at 80 and 82 and are formed of sheet metal such as stainless steel. The conveyer pan segments of each of the conveyer chains are oriented in opposed mirror image spaced relationship and are moved about an endless path by the respective conveyer chains. The pan segments, as positioned by the upper horizontal run on the conveyer, and as shown in greater detail in the sectional view of FIG. 4 define upwardly diverging sections 84 and 86 which cooperate to form an open ended trough in which random sized shrimp are received. Each of the pan segments also includes an intermediate generally horizontally oriented connector section such as shown at 88 and 90 and which are respectively connected to links of the conveyer chains 72 and 74. The connection between the pan segments and the conveyer chains may take any suitable form without departing from the spirit and scope of this invention. For example, the conveyer pan segments may be welded to the links of the conveyer chains or may be attached by means of bolts, rivets or the like. As shown in detail in FIG. 4, intermediate portions of the pan segments are reverse bent at 92 and 94 so as to define a space 96 therebetween. The reverse bent sections 92 and 94 of the conveyer pans are smoothly rounded and form opposed frictional gripping surfaces for engagement with opposite sides of individual shrimp at the lower portions of the heads to provide pivotal support for the shrimp. Below the reverse bent sections 92 and 94 of the conveyer pans the conveyer pans define downwardly diverging sections 98 and 100.

Upon placement of a quantity of random sized shrimp in the trough defined by the upwardly diverging sections of the conveyer pans, the shrimp will descend to the bottom of the troughs and the bodies or tails of the shrimp, being heavier than the head portions of the shrimp, will fall through the elongated opening 96 which is collectively defined by the conveyer pan segments. Shrimp of the size for which the grading aspects of the conveyer system is set will lodge and be restrained by the reverse bent sections 92 and 94 of the pans. Pan sections 92 and 94 provide pivotal support for the shrimp and, because the tails of the shrimp are heavier than the heads, the shrimp will be pivotally supported in the head-up, tail-down position shown in broken lines in FIG. 3. Shrimp of smaller dimension will fall through the space or slot 96 onto a slide 102 extending from a support 104 projecting from a vertical or horizontal structural element of the framework 12.

As shown in FIG. 3, the structural support 104 of the slide 102 extends substantially horizontally and then projects upwardly from a vertical structural member of the framework. The slide 102 is preferably an elongated sheet member which may be flat as shown or which may be of any other suitable form. The slide will typically be supported by a plurality of horizontal supports such as that shown at 105. The shrimp falling from the uppermost conveyer, because they are of insufficient size, will contact the angled slide member 102 and will be conducted laterally to the next succeeding shrimp grading conveyer assembly.

As shown in FIG. 2, three shrimp grading assemblies are shown to be disposed in cascading relation. The spacing between the conveyer pans of the intermediate and lower conveyer grading mechanisms are adjusted to a smaller dimension by the appropriate adjusting bars. This character of adjustment is accomplished by adjustment of the spacing of the respective sprockets or by adjusting the spacing of the conveyer pans thereof. As the conveyer pans move about the curvature of the sprockets 32 and 56 the pans will move into partially overlapping relation in the manner shown at the right and left hand portions of FIG. 1.

In view of the foregoing it is seen that random sized shrimp may be placed on the uppermost conveyer which will transport the shrimp in linear manner toward the curved end of the conveyer. As the shrimp are conveyed they are oriented in head-up, tail-down position and pivotally supported by opposed pan segments assuming that the shrimp are of a size range for which the conveyer is preset. Smaller shrimp will fall through the slot or space defined by the opposed conveyer pans of the conveyer where they will be transferred laterally by an appropriate slide onto the conveyer of a next succeeding machine located below and to one side of the uppermost conveyer. These shrimp will in turn be conveyed by the conveyer of the succeeding grading machine toward the downwardly curved portion of the conveyer.

Yet smaller shrimp will fall through the elongated slot or space defined by the intermediate conveyer and will be transferred laterally by another slide onto the conveyer of the next succeeding shrimp conveyer and grading machine. As shown in FIG. 1, the shrimp grading machine assembly will establish three different grades of shrimp, which grades may be transported by separate conveyers to appropriate facilities for further processing. As the graded shrimp reach the respective flanged ends of the conveyers the shrimp will be released by any suitable means such as a releasing arm, pan spreader, etc. The shrimp releasing arm is defined as a fixed element which is contacted by the moving shrimp and which dislodges the shrimp from the conveyer pans and allows them to fall onto a slide 110 or other conveyer which delivers them to a facility for packaging or further handling. The pan spreader would constitute any suitable implement which sufficiently spreads the opposed pan segments to effect release of the shrimp held thereby.

As shown at the lower portion of FIG. 3, a spreader arm 112 extends from the conveyer slide 110 and supports rollers 114 that spread the pans and thus release the shrimp. The released graded shrimp will fall onto a slide or conveyer as mentioned above. Although the shrimp grading machine system shown in the drawings incorporates three grading assemblies, such is not intended to be limiting with regard to the present invention. A machine may incorporate as many independently adjusted shrimp conveyer and grading assemblies as is appropriate for the random sizes of shrimp being handled thereby.

It is therefore seen that the present invention is one well adapted to attain all of the objects and features hereinabove set forth, together with other features which are inherent in the apparatus itself.

Various modes of carrying out the invention are contemplated as being within the scope of the following claims, particularly point out and distinctly claiming the subject matter which is regarded as the invention.

What is claimed is:

1. A method for grading shrimp, comprising:
   (a) receiving shrimp on a conveyer incorporating a pair of endless conveyer elements revolving about spaced circular derives and having a plurality of opposed pairs of inclined grading pan segments mounted thereon and forming spaced shrimp engaging sections for establishing pivotal supporting engagement with opposed sides of shrimp of a predetermined size range, the spacing of said shrimp engaging sections forming a grading slot,
   (b) orienting said shrimp for serial travel along said conveyer and simultaneously conveying supported shrimp along said conveyer;
   (c) supporting shrimp of a predetermined size range the minimum of which being determined by the width of said grading slot by opposed pivotal engagement thereof by said shrimp engaging sections of said grading pan segments such that said shrimp are pivotally supported at the joint of the head and body by said shrimp engaging sections of said grading pan segments, said shrimp being oriented by pivoting under the influence of gravity to head-up, body-down positions, shrimp smaller than said predetermined size range falling through said slot;
   (d) conveying said supported shrimp to a release position by rotation of said endless conveyer elements; and
   (e) releasing said supported shrimp at said release position, said shrimp, when released, descending by gravity from said conveyer.

2. The method of claim 1, wherein:
   said conveying induces linear movement to said shrimp along a path defined by said conveyer followed by downward arcuate movement of said shrimp at the trailing end of said conveyer.

3. The method of claim 1, wherein a plurality of shrimp grading machines are placed in cascading serial relation and transfer means conducts shrimp falling from one of said conveyers to the conveyer of the next succeeding shrimp grading machine, said shrimp falling from one of said conveyers by said grading are received by the conveyer of the next succeeding shrimp grading machine and are further graded by the conveyer causing the smaller shrimp to fall from said conveyer to the conveyer of the next succeeding shrimp grading machine and so on, said method including:
   transferring shrimp falling through said grading slot to the conveyer of the next succeeding shrimp grading machine.

4. A method for grading shrimp, comprising:
   (a) receiving shrimp on a conveyer incorporating opposed inclined pan segments each having shrimp engaging sections thereon and being spaced to form a grading slot therebetween,
   (b) orienting said shrimp with said shrimp linearly aligned for serial travel along said conveyer;
   (c) supporting said shrimp by opposed frictional engagement thereof by said shrimp engaging sections of said pan segments such that said shrimp are pivotally supported in said grading slot by said pan segments, said shrimp pivoting under the influence of gravity to head-up, body-down positions;
   (d) moving said shrimp in serial fashion along said conveyer by said pan segments, during said moving shrimp smaller than said predetermined size falling from said conveyer through said grading slot and causing shrimp of said predetermined size and larger to travel to the tail end of said conveyer; and
   (e) transferring shrimp of said predetermined size and larger from said tail end of said conveyer to a selected receiver therefor.

5. The method of claim 4, wherein said conveyer incorporates a pair of endless conveyer elements revolving about spaced circular drives and having a plurality of opposed pairs of said inclined pan segments each having a shrimp engaging section thereon, said shrimp engaging sections of opposed pan segments cooperatively forming said grading slot, said conveying and said orienting occurring simultaneously.

6. The method of claim 5, wherein said orienting further comprises:
   establishing pivotal support of said shrimp by said opposed shrimp engaging means for orienting movement of said shrimp by action of gravity whereupon the heavier body portions of said shrimp pivot downwardly from said shrimp engaging means and at least a part thereof projecting downwardly through said grading slot while the heads of said shrimp are positioned above said grading slot, thereby causing said shrimp to be oriented in head-up, body-down positions while being moved linearly by said conveyer.

7. The method of claim 6, wherein:
   said conveying induces linear movement to said shrimp along a path defined by said conveyer having a head end at which said shrimp are received and a tail end at which said shrimp are released by said conveyer, said tail end having a downward arcuate movement.

8. The method of claim 4, wherein said conveyer is an endless conveyer defining an elongated conveyer path having substantially straight upper and lower path sections and arcuate end path sections at said head end and said tail end, said conveying comprising:
   (a) supporting said shrimp by said opposed pairs of pans of said upper path section during movement of said pans from said head end to said tail end; and
   (b) releasing said shrimp from said opposed pairs of pan segments prior to movement of said opposed pairs of pans to said lower path section for gravity induced deposit of said shrimp on a desired receptacle therefor.

9. A method of claim 4, including:
(a) placing a plurality of shrimp grading and deheading machines, each having said conveyer and said shrimp deheading members therein in cascading serial relation; and
(b) transferring undersized shrimp falling through the slots of respective conveyers to the conveyer of the next succeeding shrimp grading machine, said shrimp falling from one of said conveyers by said grading being received by the conveyer of the next succeeding shrimp grading and deheading machine and being further graded thereby.

10. A shrimp grading mechanism comprising:
(a) an endless conveyer having a pair of spaced endless conveying elements;
(b) a plurality of spaced pairs of shrimp conveying, orienting and grading pan segments supported respectively by said endless conveyer elements and being movable thereby, said opposed pan segments cooperatively forming a trough for receiving random sizes of shrimp to be graded, said trough forming a grading slot through which undersized shrimp will fall, said shrimp conveying and grading pan segments each defining shrimp engaging sections for establishing pivotal supporting engagement with shrimp of a predetermined size range, said shrimp engaging sections forming said grading slot;
(c) said endless conveyer imparting movement to said spaced pairs of shrimp conveying and grading pan segments for transporting shrimp retained thereby to a predetermined location; and
(d) means releasing said shrimp from retention by said shrimp conveying and grading pan segments for deposit thereof at said predetermined location.

11. The shrimp grading mechanism of claim 10, including:
adjustment means for controllably establishing desired spacing of said shrimp conveying and grading pan segments to thus control the size of said grading slot and thereby establish said predetermined size range of said shrimp to be retained, conveyed and graded thereby.

12. The shrimp grading mechanism of claim 10, wherein endless conveying elements being driven at the same speed, said opposed pairs of shrimp conveying pan segments being positioned in side-by-side relation and being supported respectively by said endless conveying elements.

13. The shrimp grading mechanism of claim 12, wherein:
(a) spaced conveyer shafts are rotatably supported by said shrimp grading mechanism structure;
(b) spaced pairs of chain sprockets are nonrotatably supported by each of said conveyer shafts; and
(c) said endless conveying elements are conveyer chains supporting and orienting said shrimp conveying pan segments.

14. The shrimp grading mechanism of claim 10, including:
means for adjusting the spacing of said shrimp conveying and grading pan segments to accomplish selective grading of said shrimp.

15. The shrimp grading mechanism of claim 14, wherein said adjusting means comprises:
(a) a pair of guide bars being disposed for guiding and positioning engagement with said shrimp conveying pan segments; and
(b) guide bar adjusting means being supported by said shrimp grading mechanism and being connected to respective ones of said guide bars, said guide bar adjusting means being controllably movable relative to said shrimp selectively adjusting the relative positions of said guide bars and said shrimp conveying and grading pan segments for selectively varying the dimension of said grading slot.

16. The shrimp grading mechanism of claim 13, wherein said adjusting means comprises:
means for adjusting the spacing of said chain sprockets on said conveyer shafts.

17. The shrimp grading mechanism of claim 10, wherein:
(a) a plurality of said endless conveyers each having a plurality of said shrimp conveying orienting and grading pan segments thereon are arranged in cascading relation and are each capable of adjustment to respective selected size ranges of said shrimp;
(b) said shrimp conveying and orienting each of said plurality of endless conveyers defining a respective grading slot through which shrimp smaller than said selected size range fall; and
(c) means conducting shrimp falling through said conveyer slot to the next succeeding endless conveyer for further grading thereof.

* * * * *